United States Patent
Breyvogel et al.

(10) Patent No.: US 6,659,502 B2
(45) Date of Patent: Dec. 9, 2003

(54) IMPACT PROTECTION DEVICE AND METHOD OF PROVIDING AN IMPACT PROTECTION

(75) Inventors: Jörg Breyvogel, Lehre (DE); Hans Fehrmann, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/094,556

(22) Filed: Mar. 8, 2002

(65) Prior Publication Data

US 2002/0117839 A1 Aug. 29, 2002

Related U.S. Application Data

(63) Continuation of application No. PCT/EP00/07744, filed on Aug. 9, 2000.

(30) Foreign Application Priority Data

Sep. 8, 1999 (DE) .......................................... 199 42 886

(51) Int. Cl.⁷ .............................................. B60R 21/16
(52) U.S. Cl. ................................. 280/743.1; 280/730.2
(58) Field of Search ......................... 280/743.1, 730.2, 280/730.1

(56) References Cited

U.S. PATENT DOCUMENTS

| 4,169,613 | A |   | 10/1979 | Barnett |  |
|---|---|---|---|---|---|
| 4,181,325 | A |   | 1/1980 | Barnett |  |
| 5,492,367 | A | * | 2/1996 | Albright et al. | 280/728.1 |
| 5,613,698 | A | * | 3/1997 | Patercsak et al. | 280/728.1 |
| 5,667,243 | A | * | 9/1997 | Fisher et al. | 280/730.2 |
| 5,746,447 | A | * | 5/1998 | Dyer et al. | 280/730.1 |
| 5,765,863 | A |   | 6/1998 | Storey et al. |  |
| 5,899,490 | A | * | 5/1999 | Wipasuramonton et al. | 280/730.2 |
| 5,944,346 | A | * | 8/1999 | Lachat et al. | 280/743.1 |
| 6,065,772 | A | * | 5/2000 | Yamamoto et al. | 280/730.2 |
| 6,142,507 | A |   | 11/2000 | Okuda et al. |  |
| 6,231,070 | B1 | * | 5/2001 | Sunabashiri et al. | 280/730.2 |

FOREIGN PATENT DOCUMENTS

| DE | 94 05 143.7 |   | 6/1994 |
|---|---|---|---|
| DE | 295 17 372 U1 |   | 3/1996 |
| DE | 297 13 111 U1 |   | 3/1998 |
| DE | 197 27 832 A1 |   | 12/1998 |
| DE | 198 32 981 A1 |   | 1/1999 |
| EP | 0 798 170 A2 |   | 10/1997 |
| GB | 2 311 043 A |   | 9/1997 |
| GB | 2 322 337 A | * | 8/1998 |
| JP | 8-216821 A | * | 8/1996 |
| JP | 10 181 498 A |   | 7/1998 |
| JP | 11059311 A | * | 3/1999 |

\* cited by examiner

*Primary Examiner*—Paul N. Dickson
*Assistant Examiner*—Ruth Ilan
(74) *Attorney, Agent, or Firm*—Laurence A. Greenberg; Werner H. Stemer; Manfred Beck

(57) ABSTRACT

An impact protection device for vehicle occupants includes a gas bag having a segment and a lateral segment. The gas bag is connected to a gas generator so that gas produced by the gas generator can flow into the gas bag. In a folded-up state of the gas bag the lateral segment is disposed adjacent to the segment in such a manner that when the gas bag is inflated, the lateral segment can execute a swiveling movement away from the segment about a swivel axis so that the gas bag is transferred into an at least partially unfolded state. A method of providing an impact protection for vehicle occupants is also provided.

9 Claims, 2 Drawing Sheets

IMPACT PROTECTION DEVICE AND METHOD OF PROVIDING AN IMPACT PROTECTION

CROSS-REFERENCE TO RELATED APPLICATION

This application is a continuation of copending International Application No. PCT/EP00/07744, filed Aug. 9, 2000, which designated the United States.

BACKGROUND OF THE INVENTION

FIELD OF THE INVENTION

The invention relates to an impact protection device for vehicle occupants. The impact protection device includes a gas bag having a segment and a lateral segment. The gas bag is connected to a gas generator, so that a gas produced by the gas generator can flow into the gas bag. The invention also relates to a method of providing an impact protection.

A protection device of this type is used to prevent vehicle occupants from coming into contact with parts of a vehicle in case of an impact of the vehicle. For this purpose, the impact protection devices, which are also called airbags, are preferably disposed in frame parts of the vehicle. In this case, there is the problem of also preventing the vehicle occupants from coming into contact with parts of the vehicle in regions in which a positioning or mounting of the impact protection device is not possible due to structural reasons. These regions include, for example, the window region. The positioning of the impact protection device is also problematical, particularly in a B-pillar region of a vehicle having a sliding door, especially because of the sliding-door securing devices and the sliding-door guide which are provided in the region of the B-pillar.

German Utility Model No. DE 295 17 372 U1 discloses a gas-bag side-impact protection device which, when inflated, unfolds into a space at the side of the vehicle door. In this case, in addition to providing protection for the thorax, a gas bag is formed in the head region by discharging gas in a lateral direction. A similar configuration is also disclosed in Patent Abstracts of Japan JP 10181498-A.

U.S. Pat. No. 4,169,613 discloses an occupant protection device having an airbag which has two chambers, in which case a first airbag chamber can be inflated in front of the vehicle occupant, starting from the dashboard along the windshield in the direction of the vehicle occupant. Only if this chamber is inflated, is gas blown into a second airbag chamber which extends from the upper airbag chamber downward between the driver and the steering wheel.

German Utility Model No. DE 297 13 111 U1 discloses an airbag configuration in which a two-chambered airbag is provided, the two airbag chambers being separated from each other by a partition wall. The second airbag chamber is inflated with a time delay with respect to the first airbag chamber. For this purpose, retaining devices are provided in the airbag, the devices tearing when a certain internal gas pressure is reached in the second airbag chamber and releasing the latter for expansion.

German Utility Model No. DE 94 05 143.7 U1 discloses an airbag device having an airbag which, in the inflated state, includes an airbag side part and an airbag front part disposed at an angle thereto.

U.S. Pat. No. 5,765,863 discloses an impact protection device for vehicle occupants. The impact protection device has a gas bag which includes a segment and a lateral segment. The gas bag is connected to a gas generator, so that a gas produced by the gas generator can flow into the gas bag. More specifically, a side airbag module is provided, which includes an airbag having two chambers, the gas first of all being blown into a lower chamber assigned to the upper body region. When an occupant impacts against the lower chamber, the gas volume can then be pressed from the lower chamber into the upper chamber, which is assigned to a vehicle occupant's head region. A configuration of this type requires a special folding technique, in which certain corner or edge regions are inserted, by rotation in a pocket-like manner, from outside between two opposite side walls of the correspondingly folded remaining airbag. A folding of this type is relatively complicated and difficult to produce. There is also the risk that because of this complicated folding technique, the gas bag is not inflated in the desired manner in case of a vehicle impact, i.e. there is the risk that the functional reliability is not provided in the desired manner during the inflating process.

SUMMARY OF THE INVENTION

It is accordingly an object of the invention to provide an impact protection device which overcomes the above-mentioned disadvantages of the heretofore-known impact protection devices of this general type and which has a gas bag that can be transferred by a simple folding technique into a folded-up inoperative state, and which can be transferred with high functional reliability from the folded-up inoperative state into an operative position.

With the foregoing and other objects in view there is provided, in accordance with the invention, an impact protection device for protecting vehicle occupants, including:

a gas bag including a segment and a lateral segment disposed adjacent to the segment;

a gas generator connected to the gas bag such that gas produced by the gas generator can flow into the gas bag;

the gas bag defining an unfolding plane and a longitudinal direction extending in the unfolding plane;

the gas bag having a transition region between the segment and the lateral segment and a swivel axis extending along the transition region;

the segment and the lateral segment being disposed laterally adjacent one another with respect to the longitudinal direction, when the gas bag is in a non-activated, unfolded state;

the gas bag being foldable transversely with respect to the longitudinal direction;

the lateral segment being swivelable about the swivel axis onto the segment, when the segment and the lateral segment are folded-up transversely with respect to the longitudinal direction; and the gas bag being configured such that, when the gas bag is inflated with gas produced by the gas generator, the lateral segment performs a swiveling movement away from the segment such that the gas bag is at least in a partially unfolded state.

In other words, according to the invention, in order for the gas bag to be transferred into the non-activated, folded-up basic state starting from the unfolded and non-inflated state, in which the two segments lie next to each other in an unfolding plane, as seen in the longitudinal direction, the gas bag can be folded up transversely with respect to the longitudinal direction in the unfolding plane, and the folded-up, lateral segment can be swiveled about a swivel axis, which is situated in the transition region between the segment and the lateral segment, onto the folded-up segment, and wherein, when the gas bag is inflated through the use of the gas produced by the gas generator, the lateral segment executes a swiveling movement away from the segment in such a manner that an at least partially unfolded state of the gas bag is formed.

A folding of this type can be produced in a simple manner. Additionally, this type of folding ensures that the gas bag can be inflated in a functionally very reliable manner, since the lateral segment, in order to bring it into position at the desired inflation region, merely needs to be swiveled away from the segment by a simple swiveling movement.

According to an advantageous feature of the invention, a configuration of this type provides side impact protection in the region of the B-pillar of a vehicle having a sliding door, when the airbag is in the activated or deployed state, even if the impact protection device cannot be positioned or mounted in the B-pillar region due to structural reasons, particularly because of the sliding-door securing devices and the sliding door guide provided there. In this case, the gas bag can be disposed in its folded-up state in the region above the side window, for example.

A further advantage of the invention over the prior art is that the space required for the installation of the protection device in the motor vehicle is reduced when using the folded-up gas bag according to the invention. Moreover, the folded-up gas bag according to the invention ensures a simple folding of the gas bag, thereby ensuring, during unfolding, that the gas bag inflates in a short time, which is necessary in order to provide an effective impact protection.

According to an advantageous embodiment of the invention, the gas bag is folded up in the form of a concertina, as a result of which, firstly, the gas bag can be provided in a space-saving manner. Secondly, the problem-free unfolding of the gas bag is further improved.

According to another feature of the invention, the swivel axis extends substantially parallel to a direction of flow of the gas flowing from the gas generator into the gas bag.

According to yet another feature of the invention, the swivel axis extends substantially transversely with respect to a direction of flow of the gas flowing from the gas generator into the gas bag.

With this measure, the impact protection device can be adapted to different requirements in motor vehicles. The orientation of the swivel axis can be selected as a function of the side on which additional impact protection extending beyond the region of the impact protection device has to be formed.

According to an expedient feature of the invention, the swiveling movement can be carried out about an angle of at least 90°. As a result, in particular, an occupant protection can be ensured in a corner region of the interior of the motor vehicle.

The swiveling movement can advantageously be carried out about an angle of approximately 180°. As a result, an impact protection can be provided in regions of the interior of the motor vehicle in which a positioning of an impact protection device is not possible. These regions include, for example, the window region or the B-pillar region in the case of vehicles having a sliding door.

According to an advantageous feature of the invention, the swivel axis extends along a folding seam formed between the segment and the lateral segment. As a result, a precise definition of the swivel axis is facilitated.

According to an expedient feature of the invention, flow channels are formed in the segment. The flow channels, when the gas bag is in an unfolded state, extend substantially parallel to the direction of flow of the gas flowing from the gas generator into the gas bag. This allows guiding or steering the expansion direction of the gas flowing in, so that a correct swiveling movement of the lateral segment away from the segment is ensured.

According to a further feature of the invention, lateral flow channels are formed in the lateral segment. The flow channels, when the gas bag is in the unfolded state, extend substantially transversely with respect to the direction of flow of the gas flowing from the gas generator into the gas bag. This allows a rapid unfolding of the lateral segment which is swiveled away from the segment.

According to another feature of the invention, the gas bag is configured such that the segment can be virtually completely unfolded before the unfolding of the lateral segment begins. As a result, an optimum impact protection can initially be provided in the region of the segment before this impact protection is supplemented by unfolding the lateral segment.

In the case of a vehicle having a sliding door, the gas bag is expediently disposed in its folded-up state in a vehicle interior in such a manner that, in the unfolded state of the gas bag, a side impact protection is provided in the region of the sliding door with the aid of the lateral segment. By this measure, an impact protection is provided in a region in which a positioning of an impact protection device is not possible.

With the objects of the invention in view there is also provided, a method of providing an impact protection for vehicle occupants, the method includes the steps of:

providing a gas bag having a segment, a lateral segment, and a transition region between the segment and the lateral segment;

providing the gas bag such that the segment and the lateral segment are disposed laterally adjacent one another with respect to a given longitudinal direction when the gas bag is in a non-activated, unfolded state;

folding the gas bag transversely with respect to the given longitudinal direction for providing a folded-up segment and a folded-up lateral segment;

swiveling the folded-up lateral segment about a swivel axis extending along the transition region between the segment and the lateral segment such that the folded-up lateral segment is swiveled onto the folded-up segment; and connecting a gas generator to the gas bag.

According to another mode of the invention, the step of folding the gas bag transversely with respect to the given longitudinal axis includes folding the gas bag into a concertina-folded gas bag.

According to yet another mode of the invention, the gas generator and the gas bag are connected such that the swivel axis extends substantially parallel to a gas flow direction along which gas flows from the gas generator into the gas bag.

According to a further mode of the invention, the gas generator and the gas bag are connected such that the swivel axis extends substantially transversely to a gas flow direction along which gas flows from the gas generator into the gas bag.

According to another mode of the invention, the lateral segment is swiveled away from the segment by inflating the gas bag with the gas generator such that the lateral segment is swiveled by an angle of at least 90°.

According to yet another mode of the invention, the swivel axis extends along a folding seam between the segment and the lateral segment.

According to a further mode of the invention, flow channels are formed in the section such that the flow channels extend substantially parallel to a flow direction of gas flowing from the gas generator to the gas bag when the gas bag is in an unfolded state.

According to yet a further mode of the invention, flow channels are formed in the lateral section such that the flow channels extend substantially transversely to a flow direction of gas flowing from the gas generator into the gas bag when the gas bag is in an unfolded state.

According to a further mode of the invention, the gas bag is unfolded by substantially completely unfolding the segment before starting an unfolding of the lateral segment.

Other features which are considered as characteristic for the invention are set forth in the appended claims.

Although the invention is illustrated and described herein as embodied in an impact protection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
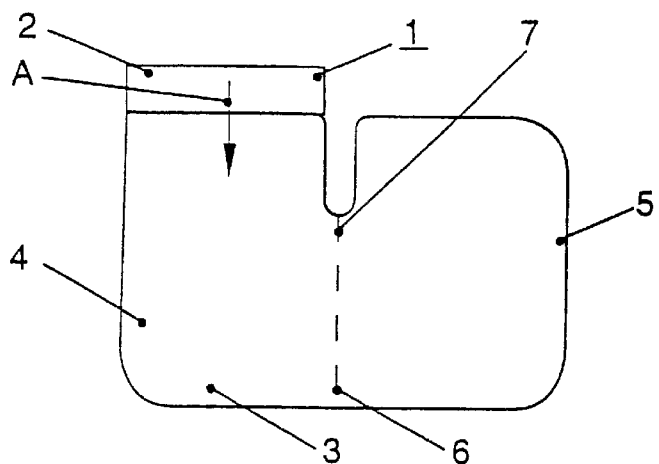
FIG. 1 is a diagrammatic front view of an impact protection device according to the invention in the unfolded state.

Referring now to the figures of the drawings in detail and first, particularly, to FIG. 1 thereof, there is shown an impact protection device 1 which has a gas generator 2. The gas generator 2 can produce gas which flows into a gas bag 3 in the direction of an arrow A. The gas bag 3 includes a segment 4 which has a direct flow connection to the gas generator 2, and a lateral segment 5 which has a flow connection to the segment 4. A seam 6 is formed between the segment 4 and the lateral segment 5 of the gas bag 3. As a result, in the region of the seam 6, a flow of the gas from the segment 4 into the lateral segment 5 is prevented at least in subsections of the seam 6. For this purpose, the seam 6 can be divided into individual segments 7 or the seam 6 can be formed to be continuous in parts.

Figure 2:
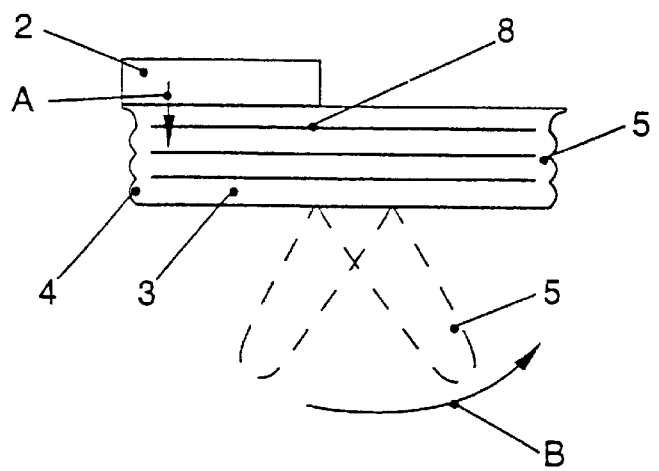
FIG. 2 is a diagrammatic front view of an impact protection device according to the invention illustrating a partially unfolded state, a swivel axis extending essentially transversely with respect to a direction of flow of the gas flowing into the gas bag.

According to FIG. 2, the gas bag is folded in the form of a concertina, so that folding edges 8 are produced. In a folded-up state of the gas bag 3, the lateral segment 5 is disposed on the segment 4. The segment 4 and the lateral segment 5 are folded here in the form of a concertina. If the gas produced by the gas generator 2 flows into the gas bag 3, the segment 4 initially unfolds at least partially. This triggers a flinging movement of the lateral segment 5. The segment 5 swivels, as is illustrated with arrow B in FIG. 2, away from the segment 4 by swiveling about a swivel axis. In this case, the swiveling movement of the lateral segment 5 preferably covers an angle of between 90° and 180°. Before the beginning of the swiveling movement, the lateral segment 5 is not unfolded yet or is only partially unfolded.

In the case of the embodiment of an impact protection device 1 according to FIG. 2, the swivel axis extends essentially transversely with respect to the direction of flow A of the gas produced by the gas generator 2.

Figure 3:
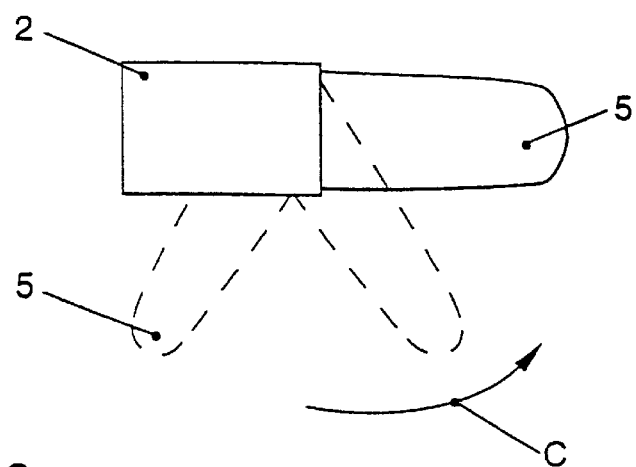
FIG. 3 is a diagrammatic top view of an impact protection device according to the invention illustrating a partially unfolded state, the swivel axis extending essentially parallel to the direction of flow of the gas flowing into the gas bag.

FIG. 3 shows an impact protection device 1 in top view. In the case of this embodiment, the lateral segment 5, in the folded-up state of the gas bag 3, is disposed adjacent to the segment 4 in such a manner that during the unfolding of the gas bag 3 the swiveling movement of the lateral segment 5 takes place about a swivel axis which extends essentially parallel to the direction of flow of the gas produced by the gas generator 2. In the case of the swiveling movement in the direction of an arrow C, the swivel axis in FIG. 3 extends essentially perpendicular to the plane of projection. Also in the case of this embodiment, the swiveling movement preferably covers an angle of between 90° and 180°.

Figure 4:
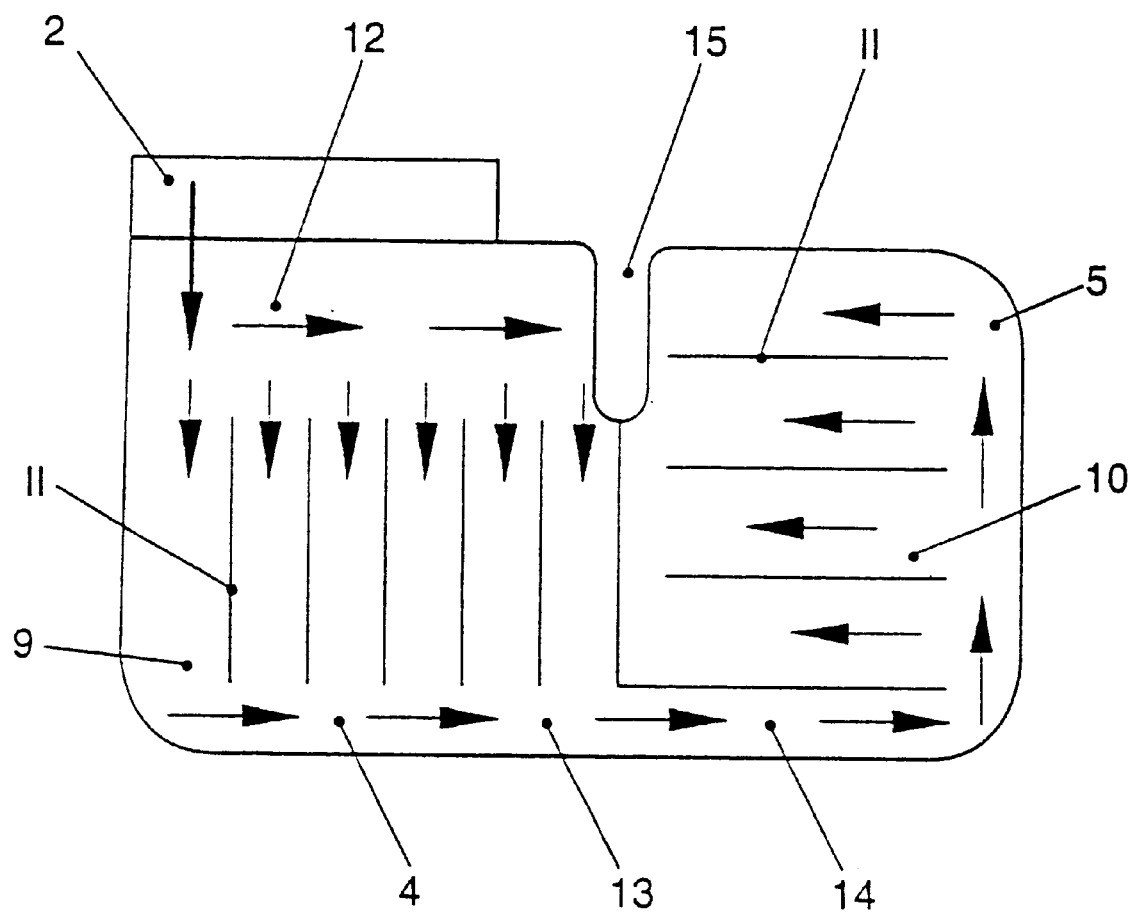
FIG. 4 is a diagrammatic front view of an impact protection device with flow channels according to the invention.

As shown in FIG. 4, flow channels 9 can be formed in the segment 4 and lateral flow channels 10 can be formed in the lateral segment 5. The flow channels 9 and the lateral flow channels 10 are in each case formed with the aid of separating lines 11. In order to form the separating lines 11, side surfaces of the gas bag 3 are bonded to one another along the separating lines 11 or are connected to one another with the aid of seams which are to be sealed.

With the aid of the flow channels 9, the gas flowing from the gas generator 2 into the gas bag 3 is guided from a region 12, which is adjacent to the gas generator 2, into a region 13 on the opposite side of the segment 4 of the gas bag 3. This firstly ensures that, when the gas bag 3 is unfolded, first of all the segment 4 is essentially unfolded completely before the lateral segment 5 executes the swiveling movement away from the segment 4. Secondly, the profile of the flow channels 9 according to FIG. 4 assists in producing a sufficient impulse or momentum in order to trigger the swiveling movement.

The gas subsequently flows through a channel 14 into the lateral segment 5 and is guided there with the aid of the lateral flow channels 10 in such a manner that the lateral segment 5 is completely unfolded.

An indentation 15 is formed between the segment 4 and the lateral segment 5 in such a manner that the swiveling movement of the lateral segment 5 away from the segment 4 is assisted.

The features disclosed in the above description, the figures and the claims can be important both on their own and in any desired combination in order to realize the invention in its various embodiments.

We claim:

1. An impact protection device for protecting vehicle occupants, comprising:
 a gas bag including a segment and a lateral segment adjacent said segment;
 a gas generator connected to said gas bag such that gas produced by said gas generator can flow into said gas bag;
 said gas bag defining an unfolding plane and a longitudinal direction extending in the unfolding plane;
 said gas bag having a transition region between said segment and said lateral segment and a swivel axis extending along said transition region;

said segment and said lateral segment being disposed laterally adjacent one another with respect to the longitudinal direction, when said gas bag is in a non-activated, unfolded state;

said gas bag being foldable transversely with respect to the longitudinal direction;

said lateral segment being swivelable about the swivel axis onto said segment, when said segment and said lateral segment are folded-up transversely with respect to the longitudinal direction;

said gas bag being configured such that, when said gas bag is inflated with gas produced by said gas generator, said segment is substantially completely unfolded before an unfolding of said lateral segment starts, and said lateral segment performs a swiveling movement away from said segment such that said gas bag is at least in a partially unfolded state;

said gas generator defining a gas flow direction along which gas flows from said gas generator into said gas bag; and said lateral segment having lateral flow channels formed therein, said lateral flow channels extending substantially transversely to the gas flow direction when said gas bag is in an unfolded state.

2. The device according to claim 1, wherein said gas bag has a concertina-folded shape.

3. The device according to claim 1, wherein the swivel axis extends substantially parallel to the gas flow direction.

4. The device according to claim 1, wherein the swivel axis extends substantially transversely to the gas flow direction.

5. The device according to claim 1, wherein the swiveling movement covers an angle of at least 90°.

6. The device according to claim 1, wherein the swiveling movement covers an angle of substantially 180°.

7. The device according to claim 1, wherein:

said gas bag has a folding seam extending between said segment and said lateral segment; and the swivel axis extends along said folding seam.

8. The device according to claim 1, wherein said segment has flow channels formed therein, said flow channels extend substantially parallel to the gas flow direction when said gas bag is in the unfolded state.

9. A method of providing an impact protection for vehicle occupants, the method which comprises:

providing a gas bag having a segment, a lateral segment, and a transition region between the segment and the lateral segment;

providing the gas bag such that the segment and the lateral segment are disposed laterally adjacent one another with respect to a given longitudinal direction when the gas bag is in a non-activated, unfolded state;

folding the gas bag transversely with respect to the given longitudinal direction for providing a folded-up segment and a folded-up lateral segment;

swiveling the folded-up lateral segment about a swivel axis extending along the transition region between the segment and the lateral segment such that the folded-up lateral segment is swiveled onto the folded-up segment;

connecting a gas generator to the gas bag; and unfolding the gas bag by substantially completely unfolding the segment before starting an unfolding of the lateral segment.

* * * * *